A. L. SHARBONDY.
COVER FOR VEHICLES.
APPLICATION FILED DEC. 17, 1917.
1,279,596.
Patented Sept. 24, 1918.
3 SHEETS—SHEET 1.
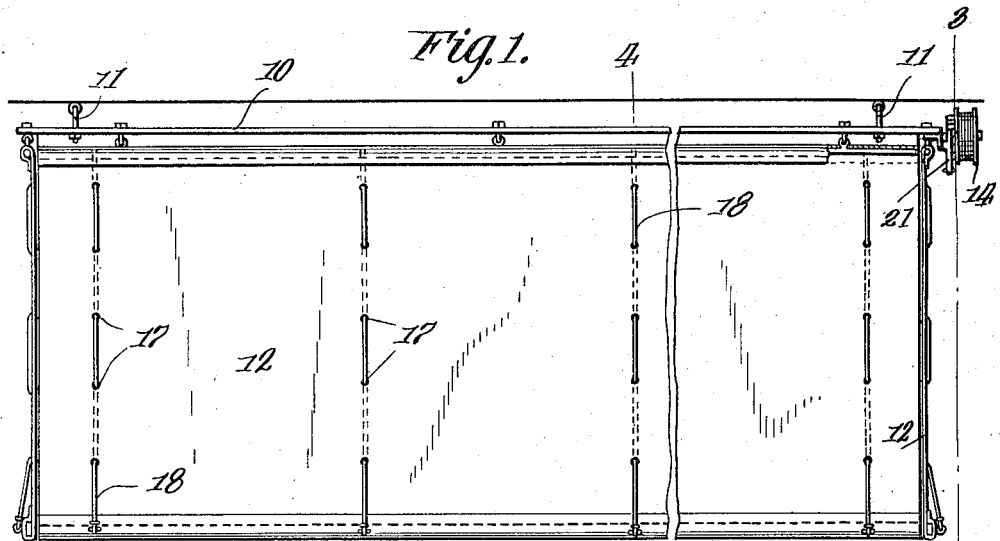
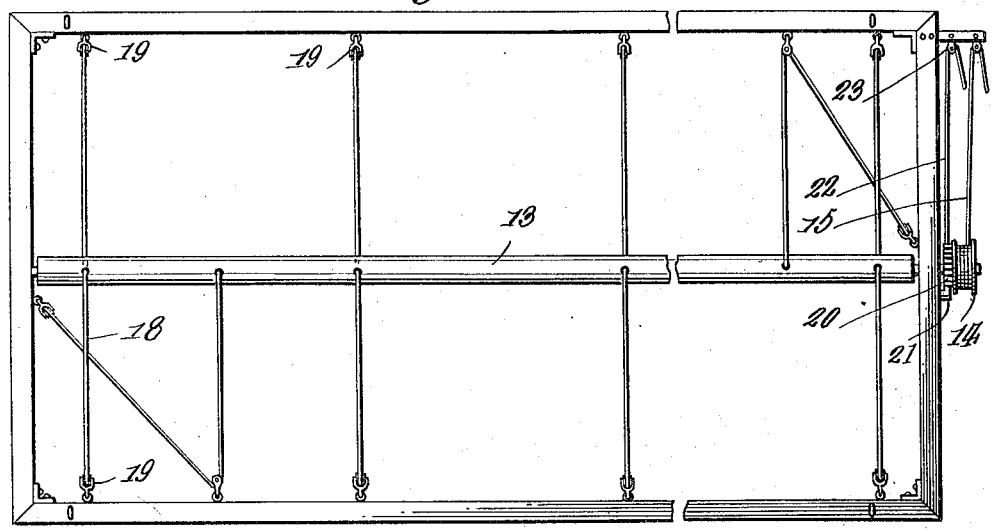
INVENTOR
Alvin L. Sharbondy
WITNESSES
Guy M. Spring
Dwight B. Galt
BY Richard B. Owen
ATTORNEY A. L. SHARBONDY.
COVER FOR VEHICLES.
APPLICATION FILED DEC. 17, 1917.
1,279,596.
Patented Sept. 24, 1918.
3 SHEETS—SHEET 2.
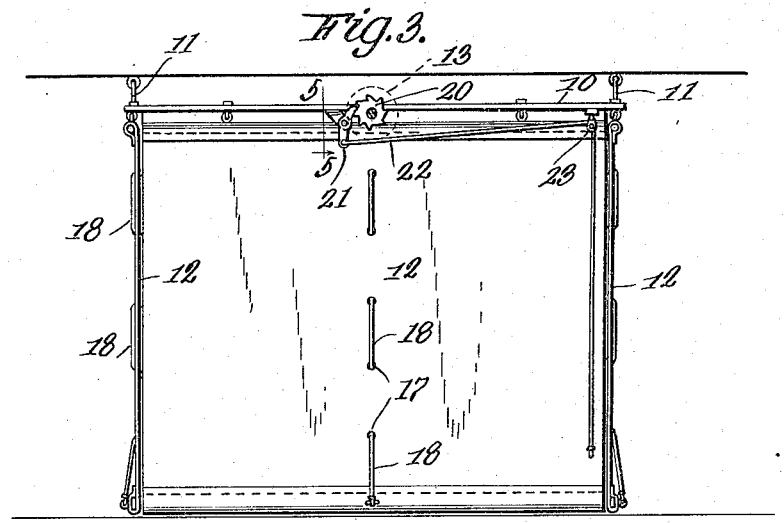
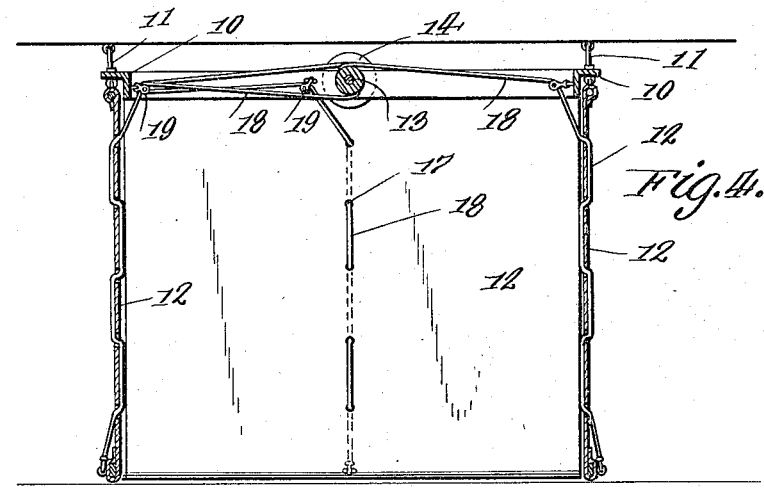
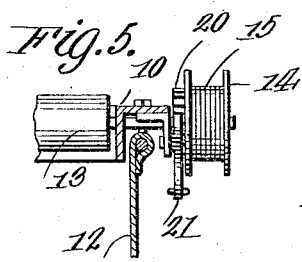
WITNESSES
Guy M. Spring
Dwight B. Gale
INVENTOR
Alvin L. Sharbondy
BY Richard Owen
ATTORNEY A. L. SHARBONDY.
COVER FOR VEHICLES.
APPLICATION FILED DEC. 17, 1917.
1,279,596.
Patented Sept. 24, 1918.
3 SHEETS—SHEET 3.
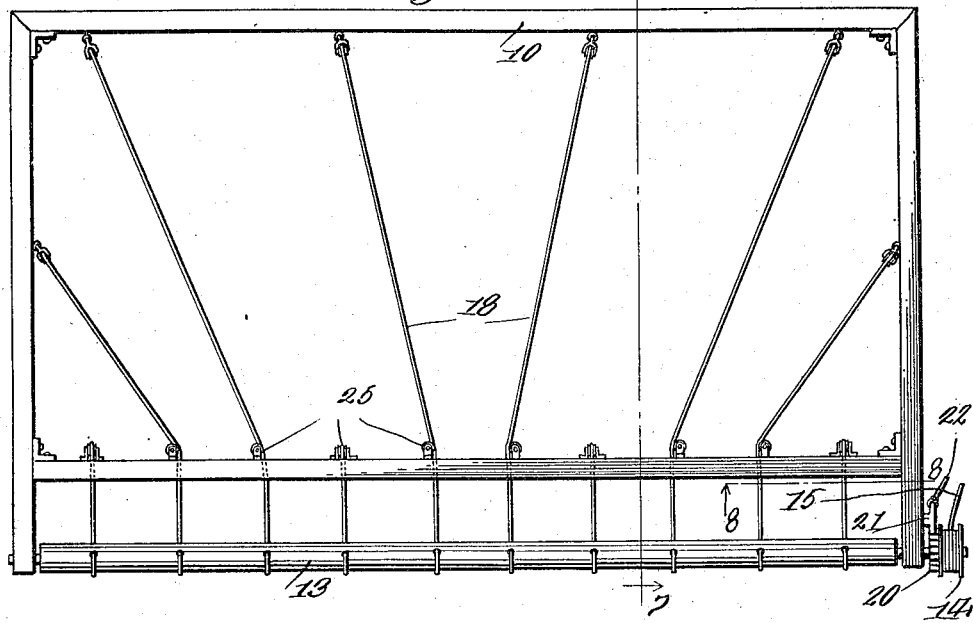
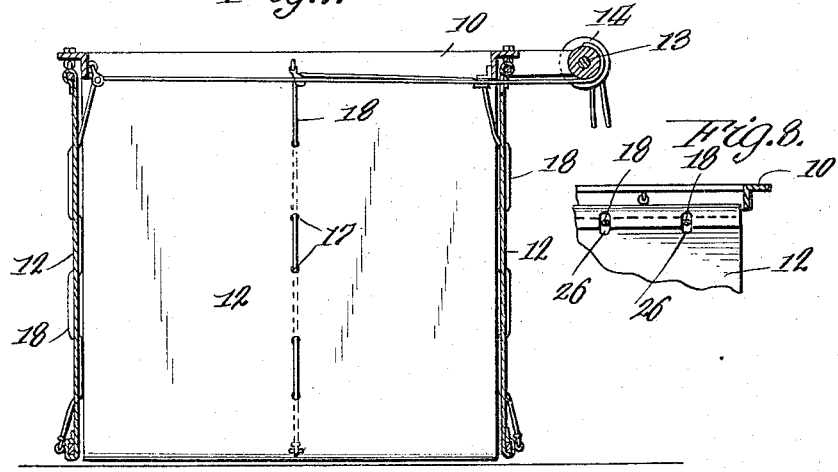
WITNESSES
Guy M. Spring
Dwight B. Galt
INVENTOR
Alvin L. Sharbondy
BY Richard B. Owen
ATTORNEY

UNITED STATES PATENT OFFICE.

ALVIN L. SHARBONDY, OF CLOVERDALE, IOWA.

COVER FOR VEHICLES.

1,279,596.  Specification of Letters Patent. Patented Sept. 24, 1918.

Application filed December 17, 1917. Serial No. 207,596.

*To all whom it may concern:*

Be it known that I, ALVIN L. SHARBONDY, a citizen of the United States, residing at Cloverdale, in the county of Osceola and State of Iowa, have invented certain new and useful Improvements in Covers for Vehicles, of which the following is a specification.

This invention relates to covers for vehicles, and is adapted particularly for use within buildings such as garages to prevent dust gaining access to the vehicles, having for its primary object to generally simplify and improve the construction and operation of such devices, as well as to increase the efficiency of the same.

A further object of the invention is to provide an improved cover for vehicles which, when not in use, may be moved to such position as to be entirely out of the way, thus economizing space in the garage.

A still further object of the invention is to provide a cover of the character mentioned which includes a plurality of collapsible walls, adapted when in use to inclose the ends and sides of the vehicle to prevent dust gaining access thereto, and which may very easily and quickly be folded and moved upwardly above the vehicle to permit of the latter being moved.

Still further objects reside in providing a vehicle cover which shall be of extremely simple and inexpensive construction; which is capable of being quickly installed in a garage or building; which comprises but very few simple and easily assembled parts, all of which are so constructed and arranged as to lessen the opportunity for wear or breakage; and which will prove thoroughly practical in use.

With these objects in view together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a side elevation, parts broken away, of a vehicle cover of my invention, Fig. 2 is a top plan view of the device shown in Fig. 1, Fig. 3 is a transverse sectional view taken substantially upon line 3—3 of Fig. 1, Fig. 4 is a similar view taken upon line 4—4 of Fig. 1, Fig. 5 is a slightly enlarged fragmentary sectional view taken upon line 5—5 of Fig. 3, Fig. 6 is a top plan view of a cover and supporting frame constituting a slightly modified form of the invention, Fig. 7 is a vertical transverse sectional view taken upon line 7—7 of Fig. 6, and Fig. 8 is a fragmentary detail view taken upon line 8—8 of Fig. 6.

In carrying out the invention, I provide a rectangular frame indicated generally at 10, secured as at 11 to the ceiling of the garage directly over the place to be occupied by the vehicle. This frame is of a length and width slightly greater than that of the vehicle, and is preferably secured to the garage ceiling, so as to clear the top of the vehicle. In the present instance this frame is made of light angle iron but it will be understood that any preferred material may be used in constructing the same.

Secured at their upper edges to the longitudinal and lateral bars of this frame 10 are collapsible walls 12, formed preferably of fabric. These walls extend throughout the length and width of the frame, and are capable of reaching to the floor when extended.

Extending throughout the length of the frame 10 and preferably supported by the latter is a drum 13. In the preferred embodiment of the invention, this drum is disposed centrally and longitudinally of the frame, and is in the same horizontal plane with the latter. The axle which supports the drum 13 may protrude beyond one end of the supporting frame, and this protruding end is equipped with a spool 14, to the periphery of which one end of a winding cable or cord 15 is secured. The cable 15 is led to one side of the frame, and passes downwardly over a guide pulley or roller 16 so as to be within convenient reach of the operator of the cover.

The fabric end and side walls constituting the cover are provided with vertically disposed series of spaced apertures 17, through which cords or cables 18 are passed. The lower ends of these cords are secured to the bottoms of the side and end walls, while the opposite ends of the said cords are secured to the drum 13. These cords 18 may also be passed over suitable guide pulleys 19 secured to the side and end bars of the frame directly above their respective vertically disposed series of openings 17. The cords are attached to the drum 13 in such manner that when the latter is rotated in one direction, the cords will be wound upon the drum, whereupon the side and end walls will be lifted and folded compactly against the frame bars. When the drum is released, the weight of the fabric walls will cause the drum to unwind, and the walls will be extended until their lower ends reach the floor of the garage.

The axle of the drum 13 may also be provided with a ratchet wheel 20, which is normally engaged by a pawl 21 pivoted upon the frame 10; the ratchet and pawl arrangement preventing unwinding movement of the drum. A cord 22 is secured to the pawl 21, and passes downwardly over a guide-pulley 23 to be within convenient reach of the operator and from the construction shown in the drawings, it is obvious that when the cord 22 is pulled, the pawl 21 will be moved out of engagement with the ratchet wheel 20, permitting the drum to unwind.

In Figs. 6 to 8 inclusive, there is shown a slightly modified form of the invention, and wherein the drum 13 is disposed to one side of the frame 10. The end bars of the frame may be extended to one side to provide supports for the ends of the drum, and the ratchet mechanism and spool for controlling the rotatary movements of the drum may be arranged on one end of the drum axle in the same manner as that referred to in the preferred form of the invention. The controlling cords 18 for the collapsible walls of the cover pass over guide pulleys 25 secured to one of the longitudinal rails of the frame, and are then connected to the drum 13. If desired, the upper end of the fabric wall adjacent the drum 13 may be provided with apertures 26 as shown in Fig. 8 of the drawings, to permit of the cords 18 passing through the same to the drum 13.

In operation, assuming the walls 12 to be raised, the vehicle is driven in directly beneath the frame 10. The cable 22 is then pulled so as to release the pawl 21 from engagement with the ratchet 20, and the walls 12 will at once drop upon all four sides of the vehicle. The latter is thus efficiently protected from dust or rain, and is also protected from rays of light. The supporting frame 10 may be secured close to the ceiling of the garage if desired, so that dust cannot gain access to the interior of the cover over the top thereof. If desired, the frame 10 may be entirely dispensed with, and the walls and controlling apparatus may be secured directly to the garage ceiling.

With the use of a cover of the above described character it is seen that the objects of the invention are efficiently accomplished. By having the fabric walls, drum and operating apparatus all attached to or carried by the frame 10, the improved cover may be very easily applied to or removed from the ceiling of the garage, without having to employ special skill and without the use of a variety of tools.

While the present is a disclosure of what is believed to be the preferred embodiment of the invention, it is to be understood that the invention is not limited thereto, as various changes in the minor details of construction, proportion, and arrangement of parts may be resorted to if desired without departing from the spirit of the invention as defined by the appended claims.

I claim:—

1. In a device of the class described, a rectangular supporting frame disposed horizontally, a fabric wall depending from each side of said frame, a drum rotatably mounted in the same horizontal plane with said frame, cords secured at one end to said drum and at their opposite ends to said fabric walls adjacent the lower ends thereof, a ratchet on said drum, a pawl engaged with said ratchet, a cord attached to said pawl and being adapted when moved in one direction to move said pawl to ratchet releasing position, and a cord for winding said drum.

2. In a device of the class described, a rectangular supporting frame, the said frame comprising a pair of spaced longitudinal bars, lateral bars connecting the said longitudinal bars at the ends thereof, a roller rotatably mounted upon said frame beyond one of the said bars, and the said roller and longitudinal bars being in the same horizontal plane, pulleys arranged upon the lateral and longitudinal bars, cords secured at one end to said roller and passed over the said pulleys, fabric walls depending from the longitudinal and lateral bars of said frame, the said cords extending downwardly and connected at their lower ends to the lower extremities of said fabric walls, and means for rotating said roller.

In testimony whereof, I affix my signature in presence of two witnesses.

ALVIN L. SHARBONDY.

Witnesses:
GLENN D. GLAZIER,
M. D. BLOAT.

Copies of this patent may be obtained for five cents each, by addressing the "Commissioner of Patents, Washington, D. C."